US010571044B2

(12) United States Patent
Courthieu et al.

(10) Patent No.: US 10,571,044 B2
(45) Date of Patent: Feb. 25, 2020

(54) ADAPTER SYSTEM FOR A CHECK VALVE

(71) Applicant: Airbus Operations SAS, Toulouse (FR)

(72) Inventors: Bernard Courthieu, Auterive (FR); Christian Dellac, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 2 days.

(21) Appl. No.: 15/961,447

(22) Filed: Apr. 24, 2018

(65) Prior Publication Data

US 2018/0313464 A1 Nov. 1, 2018

(30) Foreign Application Priority Data

Apr. 27, 2017 (FR) .................................... 1753662

(51) Int. Cl.
| *F16K 43/00* | (2006.01) |
|---|---|
| *F16K 15/03* | (2006.01) |
| *G01M 3/02* | (2006.01) |
| *B64D 37/00* | (2006.01) |
| *F16K 1/20* | (2006.01) |

(Continued)

(52) U.S. Cl.
CPC ............ *F16K 43/00* (2013.01); *B64D 37/005* (2013.01); *B64D 37/10* (2013.01); *F16K 1/20* (2013.01); *F16K 15/03* (2013.01); *F16L 55/11* (2013.01); *G01M 3/022* (2013.01)

(58) Field of Classification Search
CPC .. F16K 43/00; F16K 1/20; F16K 15/03; F16L 55/11; B64D 37/10; B64D 37/005; G01M 3/022
See application file for complete search history.

(56) References Cited

U.S. PATENT DOCUMENTS

| 1,772,086 | A | * | 8/1930 | Porter | ..................... F16K 15/03 |
|---|---|---|---|---|---|
| | | | | | 137/454.2 |
| 2,048,088 | A | * | 7/1936 | Wagner | ................... F16K 15/03 |
| | | | | | 137/519 |

(Continued)

FOREIGN PATENT DOCUMENTS

| DE | 202016103334 | 7/2016 |
|---|---|---|
| EP | 2592316 | 5/2013 |
| FR | 2561742 | 9/1985 |

OTHER PUBLICATIONS

French Search Report, dated Dec. 11, 2017, priority document.

*Primary Examiner* — Matthew W Jellett
*Assistant Examiner* — Christopher D Ballman
(74) *Attorney, Agent, or Firm* — Greer, Burns & Crain, Ltd.

(57) ABSTRACT

An adapter system for a check valve which comprises a housing open at the bottom and a lateral wall pierced by a hole, and a flap fitted inside the housing and movable between a shut-off position in which the flap shuts off the hole and a free position in which the flap does not shut off the hole. A plug is provided for being inserted into the hole through an end face and a stop is provided for being placed against the lateral wall of the housing opposite the lateral wall pierced by the hole and comprising an attachment device provided for attaching the stop to the housing and provided so that the plug comes to rest against the stop. Such an adapter system may be installed without it being necessary to dismantle the housing.

6 Claims, 2 Drawing Sheets

(51) Int. Cl.
*B64D 37/10* (2006.01)
*F16L 55/11* (2006.01)

(56) References Cited

U.S. PATENT DOCUMENTS

| | | | | |
|---|---|---|---|---|
| 2,654,388 A * | 10/1953 | Glass | F16K 15/03 |
| | | | 137/115.18 |
| 2,918,934 A * | 12/1959 | Wheatley | F16K 15/03 |
| | | | 137/527.2 |
| 3,955,592 A | 5/1976 | Guyton | |
| 3,974,654 A * | 8/1976 | Mirto, Jr. | E02B 8/045 |
| | | | 405/127 |
| 4,027,695 A * | 6/1977 | Schnatmeyer | F16K 15/033 |
| | | | 137/527 |
| 4,117,860 A * | 10/1978 | Carlin | A62C 33/00 |
| | | | 137/513.5 |
| 4,223,697 A * | 9/1980 | Pendleton | F16K 15/03 |
| | | | 137/527.8 |
| 5,056,548 A * | 10/1991 | Mills | F16K 15/03 |
| | | | 137/15.18 |
| 5,156,183 A * | 10/1992 | Scaramucci | F16K 15/033 |
| | | | 137/454.2 |
| 5,251,657 A * | 10/1993 | Scaramucci | F16K 15/03 |
| | | | 137/315.21 |
| 5,584,315 A * | 12/1996 | Powell | E03F 7/04 |
| | | | 137/15.18 |
| 6,397,874 B1 * | 6/2002 | Featheringill | E03F 1/006 |
| | | | 137/112 |
| 6,446,665 B2 * | 9/2002 | Coscarella | F16K 15/03 |
| | | | 137/409 |
| 6,557,645 B1 * | 5/2003 | Ringer | A62C 35/62 |
| | | | 137/516.25 |
| 6,779,947 B1 * | 8/2004 | Buchanan | E02B 7/40 |
| | | | 405/100 |
| 7,152,622 B2 * | 12/2006 | Scaramucci | F16K 15/033 |
| | | | 137/527.2 |
| 7,673,695 B2 * | 3/2010 | Deurloo | A62C 35/68 |
| | | | 137/527.4 |
| 7,784,489 B2 * | 8/2010 | Paulin | F04D 9/008 |
| | | | 137/527.2 |
| 7,827,853 B2 * | 11/2010 | Carson | B23K 31/12 |
| | | | 138/90 |
| 8,128,058 B2 * | 3/2012 | Quinn | F16K 1/2028 |
| | | | 251/288 |
| 8,261,771 B2 * | 9/2012 | Witkowski | F16K 15/03 |
| | | | 137/527.2 |
| 8,499,785 B2 * | 8/2013 | Humphreys | F16K 1/20 |
| | | | 137/398 |
| 9,097,363 B2 * | 8/2015 | Coscarella | E03F 7/04 |
| 9,562,642 B2 * | 2/2017 | Nomura | F16L 55/10 |
| 9,739,391 B2 * | 8/2017 | Trentadue | F16K 15/033 |
| 10,201,723 B2 * | 2/2019 | Deurloo | A62C 35/68 |
| 2013/0118612 A1 | 5/2013 | Agadi et al. | |

* cited by examiner

ADAPTER SYSTEM FOR A CHECK VALVE

CROSS-REFERENCES TO RELATED APPLICATIONS

This application claims the benefit of the French patent application No. 1753662 filed on Apr. 27, 2017, the entire disclosures of which are incorporated herein by way of reference.

TECHNICAL FIELD

The present invention relates to an adapter system for a check valve notably for performing tightness tests, a check valve provided with such an adapter system, and a method of installing such an adapter system on the housing of a check valve.

BACKGROUND OF THE INVENTION

In some industrial fields using fluid networks, it is necessary to check the tightness of these networks.

E.g., in the context of an aircraft, there are many fluid networks allowing the flow of liquids or gases.

E.g., in the case of fuel tanks, there is a pipe that connects the tanks with each other and each end of which passes through the wall of a tank and opens into the inside of the tank. This pipe allows the transfer of the fuel from one tank to the other. A check valve is arranged at each end of the pipe opening into a tank.

The check valve is suspended inside a downwardly open housing and the housing is attached onto the wall of the tank opposite the end of the pipe.

When the tightness of the supply circuit has to be tested, each housing is removed and a plug is pushed into the corresponding end of the pipe. The circuit is then placed under pressure for checking that there is no leak.

Although such a checking method gives good results, it is relatively lengthy to implement since it is necessary to dismantle the housings and then refit them at the end of checking.

SUMMARY OF THE INVENTION

One object of the present invention is to provide an adapter system for a check valve fitted on a housing which does not require dismantling the housing from its support and thus saves time when checking tightness.

For this purpose, an adapter system is provided for a check valve comprising, on the one hand, a downwardly open housing and comprising an upper wall and lateral walls extending downwards around the upper wall and one of the lateral walls of which is pierced by a hole, and, on the other hand, a flap fitted inside the housing and movable between a shut-off position in which the flap shuts off the hole and a free position in which the flap does not shut off the hole, the adapter system comprising:
  a plug provided for being inserted into the hole through an end face and
  a stop provided for being placed against the lateral wall of the housing opposite the lateral wall pierced by the hole and comprising attachment means provided for attaching the stop to the housing and provided so that the plug comes to rest against the stop.

Such an adapter system may therefore be easily fitted through the opening of the housing without it being necessary to dismantle the housing, thus saving time when checking tightness.

Advantageously, the plug is provided with at least one seal that is positioned on the periphery of the plug.

Advantageously, the attachment means comprise an arm provided for extending from the other side of the lateral wall against which the stop abuts and a clamping screw which is screwed through the arm and is provided for sandwiching the lateral wall between the clamping screw and the stop.

Advantageously, the plug has a flange, the diameter of which is greater than the diameter of the hole.

Advantageously, the plug is traversed by a conduit that extends between a first end which opens onto the end face of the plug and a second end which opens onto a lateral face of the flange.

Advantageously the second end is provided with an additional check valve which allows the flow of the fluid from the second end towards the first end and which prevents the flow of the fluid from the first end towards the second end.

Advantageously, the adapter system comprises a wedge provided for keeping the flap in a moved-apart position.

Advantageously the plug has a handle.

The invention also provides a check valve comprising:
  a housing open at the bottom and comprising an upper wall and lateral walls extending downwards around the upper wall and one of the lateral walls of which is pierced by a hole,
  a flap fitted inside the housing and movable between a shut-off position in which the flap shuts off the hole and a free position in which the flap does not shut off the hole,
  an adapter system according to one of the preceding variants.

The invention also provides a method of installing an adapter system comprising a plug and a stop comprising attachment means in a housing of a check valve further comprising a flap, the housing being open at the bottom and comprising an upper wall and lateral walls extending downwards around the upper wall and one of the lateral walls of which is pierced by a hole, and the flap being fitted inside the housing and movable between a shut-off position in which the flap shuts off the hole and a free position in which the flap does not shut off the hole, the method of installing comprising:
  a step of moving apart in the course of which the flap is moved apart from its shut-off position towards its free position,
  a first step of introduction in the course of which the plug is introduced into the housing through the bottom,
  a step of penetration in the course of which the plug is introduced into the hole,
  a second step of introduction in the course of which the stop is introduced into the housing through the bottom opposite the plug,
  a step of attachment in the course of which the stop is attached to the housing by the attachment means,
  a step of moving away in the course of which the plug is moved away to come to rest against the stop for eliminating the gap between the stop and the plug.

Advantageously, the adapter system comprises a wedge, and the method of installing comprises between the step of moving apart and the first step of introduction, a step of blocking in the course of which the wedge is installed for keeping the flap in the moved-apart position.

BRIEF DESCRIPTION OF THE DRAWINGS

The features of the invention mentioned above, as well as others, will appear more clearly on reading the following description of an embodiment, the description being made in relation to the attached drawings, in which.

DETAILED DESCRIPTION OF THE PREFERRED EMBODIMENTS

Figure 1:
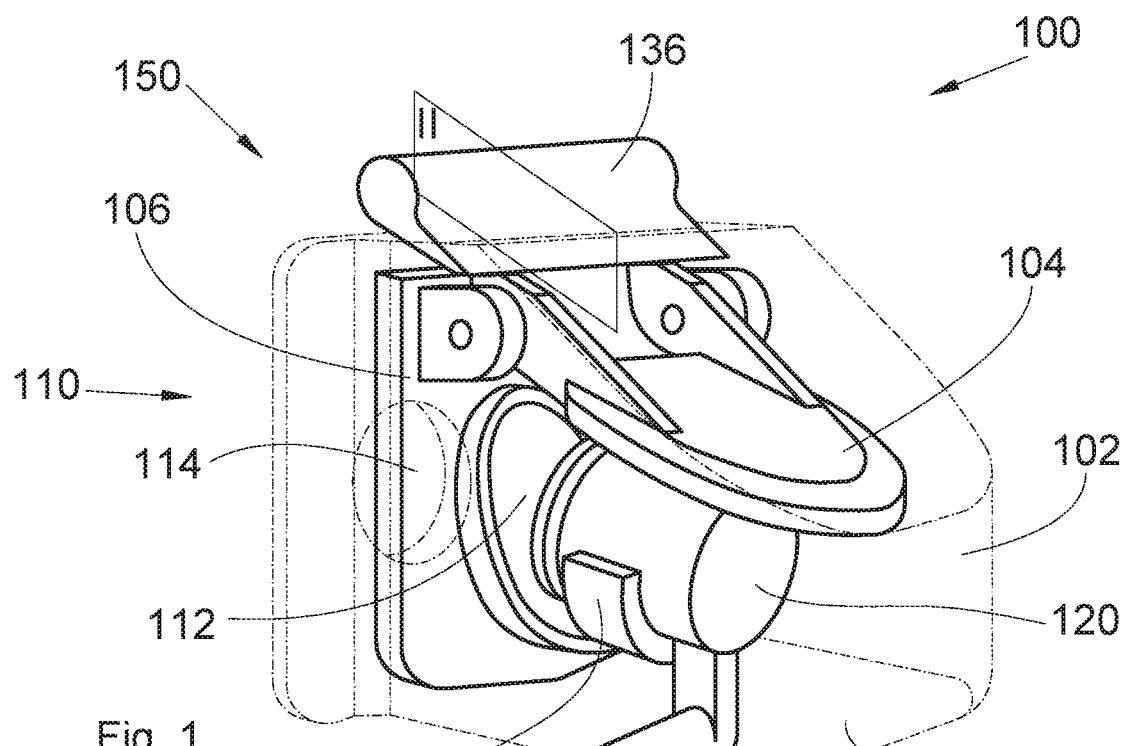
FIG. 1 shows a perspective view of a check valve with an adapter system according to the invention.

In the description that follows, the terms relating to a position are taken in reference to a check valve in the position of use, i.e., as it is represented in FIG. 1.

FIG. 1 shows an adapter system 100 which is fitted inside a housing 102 of a check valve 150. The housing 102 is shown in a transparent view and represented in mixed fine lines.

Figure 2:
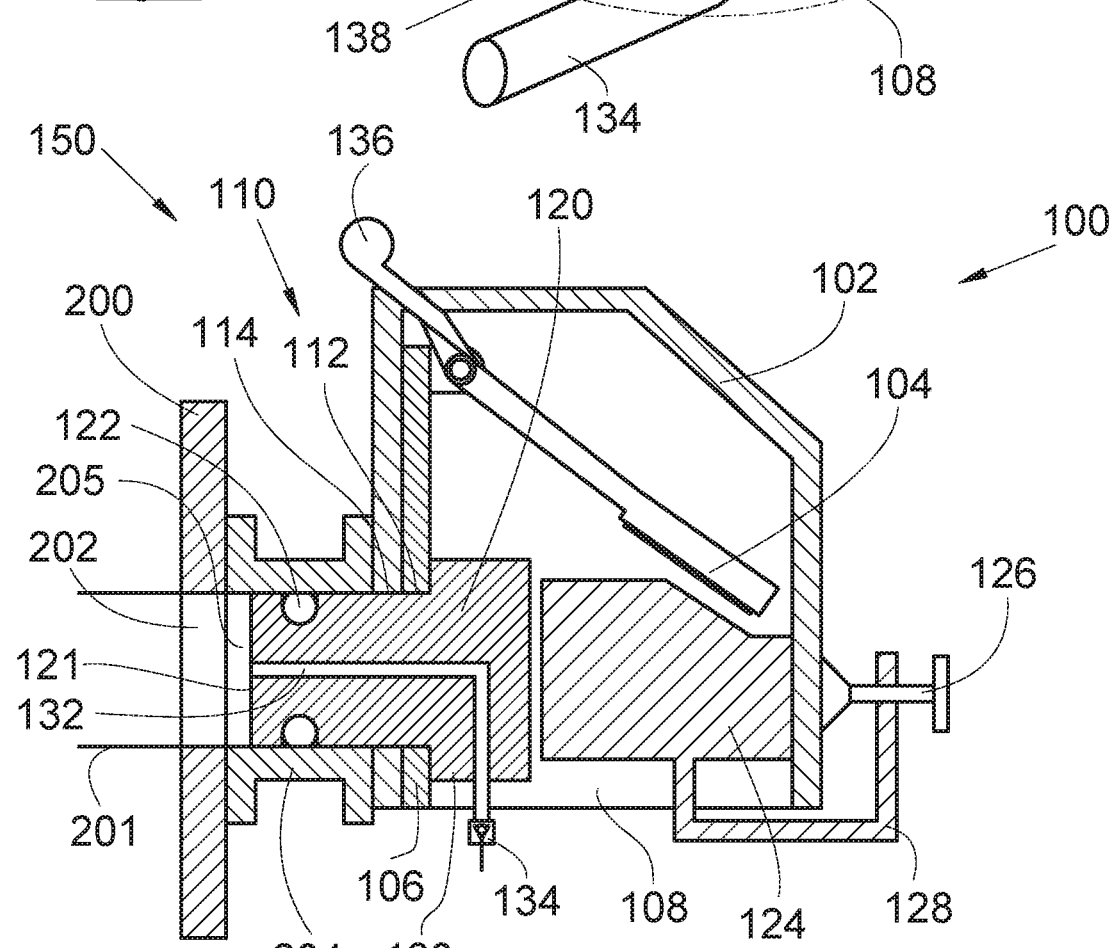
FIG. 2 is a side and sectional view along the plane II in FIG. 1

FIG. 2 shows the adapter system 100 and the check valve 150 in section through a vertical and median plane.

The housing 102 is attached onto a wall 200 pierced by a hole 202 forming the end of a pipe 201. The wall 200 is, for example, a wall of an aircraft tank, but the invention applies to any other system and in any other type of industry.

The housing 102 takes the form of a casing open at the bottom via a window 108.

In the embodiment of the invention depicted in FIGS. 1 and 2, the housing 102 comprises an upper wall forming a roof and lateral walls extending downwards around the upper wall and one lateral wall of the housing 102 of which is pierced by a hole 110 which is aligned with the hole 202 of the wall 200.

The upper wall and the lateral walls may be of one piece or attached to each other e.g., by bonding. In the same way, the shape of the housing 102 may be different, in particular more rounded so that the lateral wall which is pierced by the hole 110 adapts to the surface against which it rests, whether it is the wall 200 or an intermediate pipe 204 as described below.

In the embodiment of the invention described here, a flap 104 is suspended from a support plate 106 itself attached to the inside of the housing 102. The hole 110 of the housing 102 is then implemented by a first hole 112 made through the support plate 106 and a second hole 114 made through a lateral wall of the housing 102, the first hole 112 and the second hole 114 being aligned with the hole 202 of the wall 200. In a general way, the housing 102 and the support plate 106 may be regarded as constituting a single component and the first hole 112 and the second hole 114 then constitute a single hole.

The check valve 150 also comprises the flap 104, fitted inside the housing 102 and rotatably movable on the housing 102 between a shut-off position in which the flap 104 shuts off the hole 110 of the housing 102 and a free position in which the flap 104 does not shut off the hole 110 of the housing 102.

In the embodiment of the invention depicted in FIG. 2, the housing 102 is attached onto the wall 200 via an intermediate pipe 204 having a hole 205 that ensures the fluid continuity between the hole 202 of the wall 200 and the hole 110 of the housing 102. Of course, it is also possible to provide that the intermediate pipe 204 is an integral part of the housing 102 or that it is not present.

The various elements described above are attached to each other by all appropriate means e.g., screws. In addition, it is conventionally provided that the contact areas between each of these elements around the holes are made tight, e.g., by installing seals between two consecutive elements, such as, for example, between the wall 200 and, as the case may be, the housing 102 or the intermediate pipe 204.

The adapter system 100 comprises a plug 120 which is inserted into the hole 110 from inside the housing 102, i.e., it is introduced into the hole 110 passing through the window 108. The plug 120 has an end face 121 and the plug 120 is inserted into the hole 110 by the end face 121.

The plug 120 has a flange 130, the diameter of which is greater than the diameter of the hole 110 and which prevents the plug 120 from being pushed completely inside the hole 110.

According to its length, the plug 120 will be pushed more or less inside the holes 110, 202 and 205.

The adapter system 100 comprises a stop 124 which is placed against the lateral wall of the housing 102 which is opposite the lateral wall pierced by the hole 110 and which is attached to the housing 102 by attachment means. The stop 124 is also introduced via the window 108.

In the embodiment of the invention described here, the stop 124 is attached onto the lateral wall against which it abuts, but it may be attached to another lateral wall.

In the embodiment of the invention described here, the stop 124 has an arm 128 which extends from the other side of the lateral wall against which the stop 124 abuts, and a clamping screw 126 which is screwed through the arm 128 for sandwiching the lateral wall between the clamping screw 126 and the stop 124.

In the embodiment of the invention described here, the attachment means comprises a device comprising the arm 128 and the clamping screw 126.

When the plug 120 and the stop 124 are in place, the plug 120 comes to rest against the stop 124. The gap between the plug 120 and the stop 124 is sufficiently small so that when the plug 120 is resting against the stop 124, it remains sufficiently in the holes 110, 202, 205 for ensuring tightness.

Such an adapter system 100 is therefore particularly simple to implement and does not require the dismantling of the housing 102 when it is installed.

In the embodiment of the invention described above, the plug 120 is solid and ensures tightness, but in a particular embodiment where tightness is tested through the plug 120, a pressure must be applied to the inside of the pipe 201.

When the pressure has to be applied through the plug 120, the latter is traversed by a conduit 132 that extends between a first end which opens into the hole 110, 202, 205 on the end face 121 of the plug 120, i.e., that which is located opposite the pipe 201 and a second end which opens onto a face of the plug 120 which is located in contact with the outside i.e., which is not located inside the holes 110, 202, 205. The second end opens out at the level of a lateral face of the flange 130.

For avoiding leaks at the level of the conduit 132 when the pressure is not applied there directly, the second end is provided with an additional check valve 134 which allows the flow of the fluid from the second end towards the first end and which prevents the flow of the fluid from the first end towards the second end.

Tightness is preserved at the level of the plug 120 even in the presence of the conduit 132, since when the pressure is applied, the additional check valve 134 prevents the flow via the conduit 132.

Figure 3:
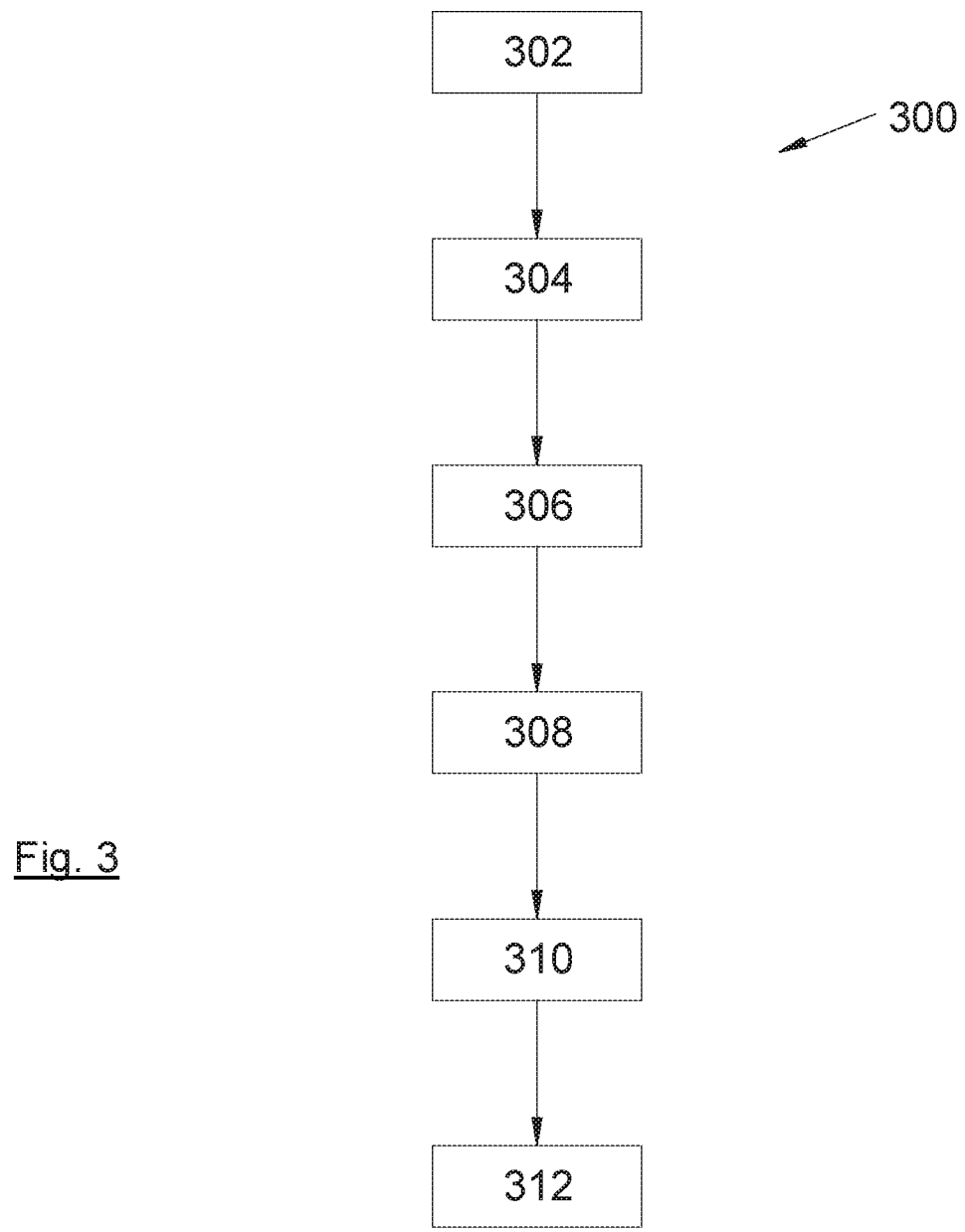
FIG. 3 shows a flow chart of a method of installing the adapter system.

FIG. 3 shows a flow chart 300 of a method of installing the adapter system 100 in the housing 102 of the check valve 150. The method comprises:

a step of moving apart 302 in the course of which the flap 104 is moved apart from its shut-off position towards its free position for allowing access to the hole 110, a first step of introduction 304 in the course of which the plug 120 is introduced into the housing 102 passing through the window 108, i.e., through the bottom, a step of penetration 306 in the course of which the plug 120 is introduced into the hole 110, a second step of introduction 308 in the course of which the stop 124 is introduced into the housing 102 through the window 108, i.e., through the bottom, opposite the plug 120, a step of attachment 310 in the course of which the stop 124 is attached to the housing 102 by the attachment means, a step of moving away 312 in the course of which the plug 120 is moved away to come to rest against the stop 124 for eliminating the gap between the stop 124 and the plug 120.

The gap between the plug 120 and the stop 124 facilitates the installation of the stop 124.

For ensuring the tightness of the plug 120, this is provided with at least one seal 122, in particular an O-ring seal, which is positioned between the plug 120 and the wall of the hole (here 205) against which it is positioned. The seal 122 is positioned on the periphery of the plug 120. In the step of penetration 306 the plug 120 and the seal 122 are then introduced into the hole 110.

The movements of the plug 120 in the first step of introduction and the step of moving away are facilitated by the presence of a handle 138 on the plug 120, the handle 138 being accessible by a technician through the window 108.

For facilitating the installation of the plug 120, the adapter system 100 includes a wedge 136 which is provided for keeping the flap 104 in the moved-apart position.

In the embodiment of the invention described here, the wedge 136 is introduced through a slot made in the upper wall and holds the flap 104 in place. In this context, the method of installing comprises between the step of moving apart 302 and the first step of introduction 304, a step of blocking in the course of which the wedge 136 is installed for keeping the flap 104 in the moved-apart position, here by its introduction through the window.

The adapter system 100 may be fitted onto a housing already in place as part of a routine monitoring of the tightness of the circuit comprising the housing.

But, it is also possible to fit the adapter system 100 onto a housing before the latter is permanently installed in the circuit, i.e., here before it is attached to the wall. Such an installation of the adapter system 100 onto a housing then the attachment of the pre-assembled housing and adapter system 100 saves time compared with an installation of an adapter system 100 on a housing already in place.

Indeed, according to the place where the housing is installed, access to the window 108 may require some dexterity from the technician for attaching the adapter system 100 to the housing which may involve some installation time.

Whereas if the adapter system 100 is installed on the housing before the latter is attached, the installation of the adapter system 100 is made easier, which saves time compared with an on-site installation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An adapter system for a check valve comprising a downwardly open housing comprising an upper wall and lateral walls extending downwards around the upper wall, one of the lateral walls being pierced by a hole, and a flap fitted inside the housing and movable between a shut-off position in which the flap shuts off the hole and a free position in which the flap does not shut off the hole, the adapter system comprising:

a plug insertable into the hole through an end face, and a stop placeable against the lateral wall of the housing opposite the lateral wall pierced by the hole and comprising an attachment device to attach the stop to the housing and arranged so that the plug comes to rest against the stop, wherein the plug has a flange, a diameter of which is greater than a diameter of the hole, wherein the plug is traversed by a conduit that extends between a first end which opens onto the end face of the plug and a second end which opens onto a lateral face of the flange, wherein the second end is provided with an additional check valve which allows a flow of a fluid from the second end towards the first end and which prevents a flow of the fluid from the first end towards the second end.

2. The adapter system according to claim 1, wherein the plug is provided with at least one seal positioned on a periphery of the plug.

3. The adapter system according to claim 1, wherein the attachment device comprises an arm provided for extending from the other side of the lateral wall against which the stop abuts and a clamping screw which is screwed through the arm and is provided for sandwiching the lateral wall between the clamping screw and the stop.

4. The adapter system according to claim 1, further comprising a wedge provided for keeping the flap in the free position.

5. The adapter system according to claim 1, wherein the plug has a handle.

6. A check valve comprising:

a housing open at a bottom and comprising an upper wall and lateral walls extending downwards around the upper wall, one of the lateral walls being pierced by a hole, a flap fitted inside the housing and movable between a shut-off position in which the flap shuts off the hole and a free position in which the flap does not shut off the hole, and an adapter system according to claim 1.

* * * * *